United States Patent
Miyaji

(10) Patent No.: US 8,093,856 B2
(45) Date of Patent: Jan. 10, 2012

(54) POSITION CONTROL APPARATUS FOR NUMERICALLY CONTROLLED MACHINE

(75) Inventor: Masashi Miyaji, Aichi (JP)

(73) Assignee: Okuma Corporation, Niwa-Gun, Aichi (JP)

( * ) Notice: Subject to any disclaimer, the term of this patent is extended or adjusted under 35 U.S.C. 154(b) by 320 days.

(21) Appl. No.: 12/581,569

(22) Filed: Oct. 19, 2009

(65) Prior Publication Data

US 2010/0109594 A1  May 6, 2010

(30) Foreign Application Priority Data

Oct. 31, 2008 (JP) ................................ 2008-282081

(51) Int. Cl.
*G05B 19/404* (2006.01)
(52) U.S. Cl. .................. 318/632; 318/630; 318/568.22; 700/178; 700/193; 112/117
(58) Field of Classification Search ............. 318/568.22, 318/630, 632; 700/178, 193; 112/117
See application file for complete search history.

(56) References Cited

U.S. PATENT DOCUMENTS

| | | | |
|---|---|---|---|
| 5,832,849 A * | 11/1998 | Kaetterhenry et al. | 112/117 |
| 6,107,771 A * | 8/2000 | Maeda | 318/630 |
| 6,178,903 B1 * | 1/2001 | Bondanza et al. | 112/117 |
| 6,184,644 B1 * | 2/2001 | Eguchi | 318/632 |
| 6,745,101 B2 * | 6/2004 | Andersen et al. | 700/193 |
| 7,853,351 B2 * | 12/2010 | Corey | 700/193 |
| 2008/0091295 A1 * | 4/2008 | Corey | 700/178 |

FOREIGN PATENT DOCUMENTS

JP          3351990          12/2002

OTHER PUBLICATIONS esp@cenet patent abstract for Japanese Publication No. 3351990, Publication date Dec. 3, 2002 (1 page).

* cited by examiner

*Primary Examiner* — Paul Ip
(74) *Attorney, Agent, or Firm* — Osha • Liang LLP

(57) ABSTRACT

In a position control apparatus that drives a feed-axis with a servomotor of a machine tool, the machine tool may be quickly accelerated or decelerated in a state where a machine structural member that supports and fixes a structural member including a driving system has a lower rigidity, or in a state where an element having a lower rigidity is present beyond a load position where the detection by a linear scale is performed. In such cases, a generated deflection may induce a displacement in a mechanical system. A relative locus error may be generated between a workpiece to be processed and a front end portion of the tool. Further, a mechanism rigidity generally changes according to a machine posture. The generated deflection amount changes in magnitude. The present embodiment estimates and compensates a displacement amount of the front end portion of the tool that may be caused by the deflection of the mechanical system. Moreover, in calculating an estimation amount, the present embodiment can change a parameter corresponding to the mechanism rigidity based on the machine posture. Thus, the front end of the tool can move accurately along a desired locus relative to the workpiece to be processed.

7 Claims, 5 Drawing Sheets

POSITION CONTROL APPARATUS

POSITION CONTROL APPARATUS

POSITION CONTROL APPARATUS FOR NUMERICALLY CONTROLLED MACHINE

PRIORITY INFORMATION

This application claims priority to Japanese Patent Application No. 2008-282081, filed on Oct. 31, 2008, which is incorporated herein by reference in its entirety.

BACKGROUND

1. Field of the Invention

The present invention relates to a position control apparatus that can be applied to a numerically controlled machine.

2. Related Art

Conventionally, a machine tool or a similar industrial machine is equipped with a feed-axis driving mechanism that includes a ball screw. For example, the machine tool includes a servomotor that can rotate the ball screw fixed to an output shaft thereof and is configured to linearly drive a load fixed to a ball screw nut. However, according to the above-described mechanism, a ball screw portion may cause deflection due to the weight of the load.

FIG. 4 is a block diagram illustrating an example of a conventional position control apparatus. A position command value y* generated by a host apparatus (not illustrated in the drawing) is converted into a motor rotation command value θ*. The position control apparatus receives the motor rotation command value θ* as an input command.

The conventional position control apparatus employs a feed-forward control system to improve the response of the motor. The feed-forward control system can compensate for deflection that may be generated by the ball screw. A deflection amount θdf of the ball screw can be obtained according to the following formula 1, when Mh represents a load weight, Ks represents a rigidity of a ball screw driving system, and θ* represents a position command value.

$$\theta df = (Mh/Ks) \times (d^2\theta^*/dt^2) \quad \text{formula 1}$$

A block Ca ($=(Mh/Ks) \times s^2$) can calculate the deflection amount θdf according to the above-described formula 1. An adder 51 can add the position command value θ* to the deflection amount θdf to generate a position command value θc for the control. The control system can time-differentiate the deflection amount θdf to obtain a deflection speed Vdf. The control system can further time-differentiate the position command value θ*. An adder 53 can add the deflection speed Vdf to the time-differential value of the position command value θ* to generate a speed feed-forward amount Vff. The control system can further time-differentiate the speed feed-forward amount Vff to obtain an acceleration feed-forward amount Aff. A conversion block Cb can obtain a torque feed-forward amount τff based on the acceleration feed-forward amount Aff. The torque feed-forward amount τff corresponds to a motor torque that can generate acceleration equivalent to the acceleration feed-forward amount Aff.

The conventional position control apparatus further includes the following feedback control configuration. An objective plant 50 to be controlled by the position control apparatus has a mechanism (not illustrated) that includes a servo motor configured to drive a load via a ball screw based on a torque command value τm that is input as a manipulated variable. The servo motor includes a position detector (not illustrated) incorporated therein, which can detect a motor rotational angle θm and an angular speed vm. A linear scale (not illustrated), which is provided separately, detects a position "y" of the load. The control system multiplies the load position "y" of the load by a constant (2π/P) to obtain a load position θi as a conversion value on a motor rotational axis, considering a lead P of the ball screw.

A subtracter 52 can subtract a position feedback value θf from the position command value θc for the control. A position deviation amplifier Gp can amplify a position deviation (i.e., an output of the subtracter 52). An adder 54 can add the output of the position deviation amplifier Gp to the speed feed-forward amount Vff to generate a speed command value Vc. A subtracter 55 can subtract the motor rotation angular speed vm from the speed command value Vc to obtain a speed deviation. A speed deviation amplifier Gv can perform proportional-integral amplification on the speed deviation (i.e., the output of the subtracter 55). An adder 56 can add the output of the speed deviation amplifier Gv to the torque feed-forward amount τff to generate the torque command value (i.e., motor generation torque) τm.

The following formula 2 represents a relationship of the position feedback value θf and other parameters θm, θdf, and θi, which can be obtained referring to FIG. 4.

$$\theta f = \theta m + G(S)[\theta i - (\theta m - \theta df)] \quad \text{formula 2}$$

In the formula 2, G(S) has delay system transfer characteristics, according to which G(S) takes a larger value for a low-frequency input and a smaller value for a high-frequency input in a range of $0 \leq |G(S)| \leq 1$.

Accordingly, in a stable condition, a relationship $\theta f = \theta i + \theta df$ can be satisfied. The feedback control can equalize the position command value θc with the position feedback value (i.e., θc=θf). Therefore, a relationship θ*=θi can be attained. In short, the control system can control the load position "y" accurately according to the position command value θ*. The above-described conventional position control apparatus is discussed, for example, in JP 3351990 B.

As described above, the conventional position control apparatus performs control for equalizing the position command value θ* with the load position θi by advancing the motor position (i.e., motor rotational angle) θm by an amount corresponding to the deflection amount θdf caused in the ball screw portion. However, a structural member that supports and fixes the driving system may have a low rigidity. An element having a lower rigidity may be present beyond a load position where the detection by the linear scale is performed. In such cases, the above-described conventional position control apparatus cannot compensate deflection components caused by machine elements at the lower-rigidity portions. Furthermore, in a machine having a portion that is weak or insufficient in mechanical rigidity, if it is required to drive the feed-axis with high-acceleration or deceleration, a deflection amount of a mechanical system increases with increasing acceleration.

The deflection in the mechanical system is described below in more detail. FIG. 2A illustrates a model representing a schematic mechanism of a double-column machining center as an example of a machine tool, which is one of the numerically controlled machines. A bed 11 is stationarily fixed on the ground. A table 12, which is disposed on the bed 11, can move in the X direction. A workpiece 18, i.e., an object to be machined or processed, is mounted and fixed on the table 12.

Similar to the bed 11, a pair of columns 13 is rigidly fixed on the ground. A cross rail 14 can move relative to the columns 13 in a direction indicated by W. A saddle 15 can move relative to the cross rail 14 in a direction indicated by Y. The double-column machining center includes a mechanism capable of moving a ram 16 in a direction indicated by Z (i.e., in the up-and-down direction). The ram 16 has a front end equipped with a spindle head. The double-column machining center can rotate a tool 17 attached to the spindle head of the ram 16 at a higher speed to cut (process) the workpiece 18.

Hereinafter, an operational movement in the Y direction is described below. An example system can control a servomotor (not illustrated), which is installed on the cross rail 14 and serves as a Y-axis driving system, to drive the saddle 15 via a ball screw (not illustrated). A linear scale (not illustrated) attached to the cross rail 14 can detect the position of the saddle 15.

The conventional position control apparatus can compensate a deflection component generated in the ball screw portion to equalize the position command value θ* with the position θi of the saddle 15. However, the columns 13 supporting the cross rail 14 may have a lower rigidity, or the degree of coupling between the columns 13 and the ground may be low. In such cases, for example, if the saddle 15 accelerates in the −Y direction, the cross rail 14 and the columns 13 receive reaction forces and displace in the +Y direction, as illustrated in FIG. 2B. In this case, even when the position command value θ* is equal to the position θi of the saddle 15 detected by the linear scale, the absolute position of the saddle 15 in the space deviates from a desired position by a displacement amount of the columns 13.

Similarly, when the rigidity of the ram 16 is low, if the saddle 15 accelerates in the −Y direction, the spindle head attached to the front end of the ram 16 receives an inertia force. As a result, the spindle head displaces in the +Y direction. Accordingly, a front end of the tool 17 deviates from a desired locus in the space. Therefore, the tool 17 causes a displacement relative to the workpiece 18 (i.e., an object to be processed), and the tool 17 cannot perform a cutting operation at an appropriate position.

Furthermore, the load acting point changes depending on the position of the cross rail 14 relative to the columns 13 (i.e., a W-axis coordinate value) or depending on a protruding amount (i.e., a Z-axis coordinate value) of the ram 16 relative to the saddle 15. In other words, the mechanical rigidity of the columns 13 or the ram 16 changes and, as a result, the amount of a deflection itself to be generated when the saddle 15 accelerates is variable.

The problems to be solved by the present invention include a phenomenon that a deflection may be generated in a mechanical system due to a structural member having a lower rigidity that supports and fixes a driving system, and the locus of a front end of a tool may cause a displacement relative to a workpiece to be processed. Furthermore, the displacement amount changes according to a machine posture.

An object of the present invention is to provide a position control apparatus that can constantly compensate a deflection that may be generated in the mechanical system, even if the machine posture changes. Thus, the position control apparatus according to the present invention can move the front end of the tool along a desired locus.

SUMMARY

To attain the above-described object, the present invention provides a position control apparatus that is usable in a case where a motor drives a movable portion of a numerically controlled machine to change a relative positional relationship between two control objects provided on the numerically controlled machine, wherein the position control apparatus controls the position of the movable portion based on a position command value of the motor that is input from a host apparatus. The position control apparatus includes a machine deflection amount estimation unit that calculates a machine deflection amount estimation value representing a relative displacement amount between the two control objects that may be caused by a deflection of a structural member intervening between the two control objects based on information indicating a posture of the intervening structural member and information indicating a driving acceleration of the movable portion; a machine deflection compensation amount calculation unit that calculates a machine deflection position compensation value based on the machine deflection amount estimation value for compensating at least a positional deviation that may be caused by a deflection of the intervening structural member; and a command value calculation unit that generates a new position command value for the control by adding the machine deflection position compensation value to the position command value.

In a preferred aspect of the present invention, the information indicating the posture of the intervening structural member is a machine coordinate value of the movable portion in each axial direction, and the information indicating the driving acceleration of the movable portion is the position command value of the motor. The machine deflection amount estimation unit includes a storage unit that stores acceleration proportional information that represents information for calculating an acceleration proportional coefficient of a machine deflection amount that changes according to the machine coordinate value of the movable portion in each axial direction; an acceleration proportional coefficient calculation unit that calculates the acceleration proportional coefficient of the machine deflection amount according to a present posture of the intervening structural member based on the machine coordinate value of the movable portion in each axial direction and the acceleration proportional information stored in the storage unit; two differentiators that calculate a command acceleration that corresponds to a second-order differential value of the position command value of the motor; and a multiplier that calculates the machine deflection amount estimation value by multiplying the acceleration proportional coefficient of the machine deflection amount by the command acceleration.

In a preferred aspect of the present invention, at least one of the two control objects is disposed on the movable portion, and the machine deflection amount estimation unit calculates a deflection amount generated in a movable direction of the movable portion as the machine deflection amount estimation value.

In a preferred aspect of the present invention, the position control apparatus further includes a calculation unit that calculates a speed command value using a position deviation amplifier that can amplify a differential value between the position command value of the motor and a position detection value, and a calculation unit that calculates a torque command value using a speed deviation amplifier that can amplify a differential value between the speed command value and a time-differential value of the position detection value. The machine deflection compensation amount calculation unit calculates at least one of a machine deflection speed compensation value and a machine deflection torque compensation value in addition to the machine deflection position compensation value, and the command value calculation unit calculates a new speed command value for the control by adding the machine deflection speed compensation value to the speed command value in a case where the machine deflection speed compensation value is calculated, and further the command value calculation unit calculates a new torque command value for the control by adding the machine deflection torque compensation value to the torque command value in a case where the machine deflection torque compensation value is calculated.

In a preferred aspect of the present invention, the machine deflection compensation amount calculation unit calculates the machine deflection position compensation value using a proportional compensator based on the input machine deflection amount estimation value, calculates a machine deflection speed compensation value using a differentiator and a proportional compensator, and calculates a machine deflection torque compensation value using two differentiators, an acceleration-torque conversion coefficient, and a proportional compensator, wherein position, speed, and torque compensation values are adjusted by changing setting values of the proportional compensators.

In the above-described cases, the command value calculation unit can calculate a new speed command value for the control by subtracting the machine deflection speed compensation value from the time-differential value of the position detection value that serves as a speed feedback value. Moreover, the command value calculation unit can calculate a new position command value for the control by subtracting the machine deflection position compensation value from the position detection value that serves as a position feedback value.

The position control apparatus according to the present invention can constantly compensate a deflection that may be generated in the mechanical system even when the deflection is caused due to the rigidity of a structural member that supports and fixes a driving system. And, it is adapted for the amount of deflection which changes according to the machine posture. Thus, the position control apparatus according to the present invention can move the front end of the tool along a desired locus.

DETAILED DESCRIPTION

An embodiment of the present invention is described below with reference to attached drawings.

Figure 2A:
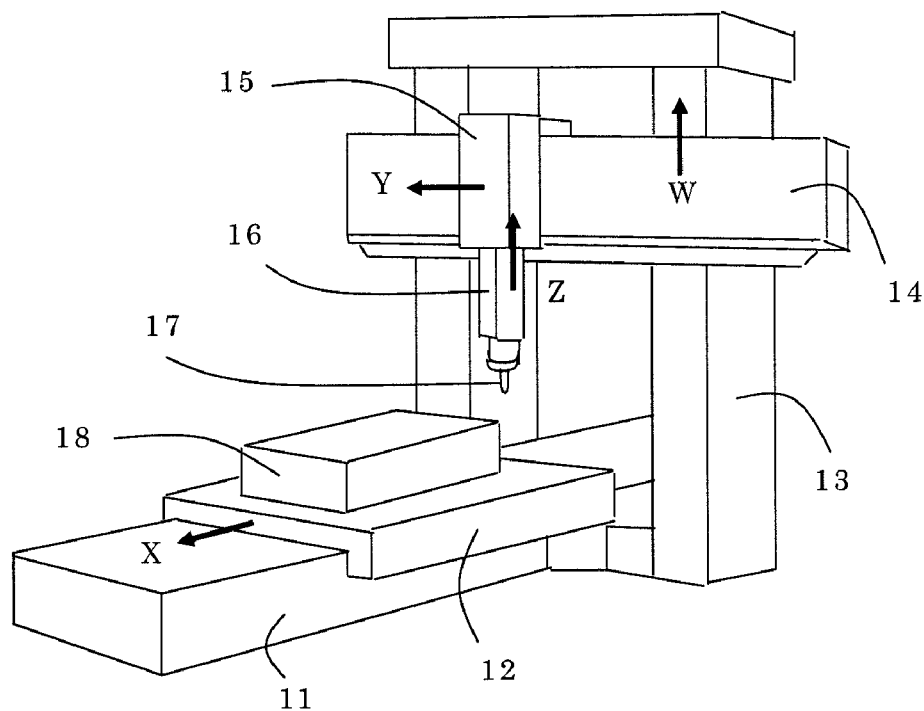
FIG. 2A illustrates a model representing a schematic mechanism of a numerically controlled machine that may generate a problem to be solved by the present invention.
Figure 2B:
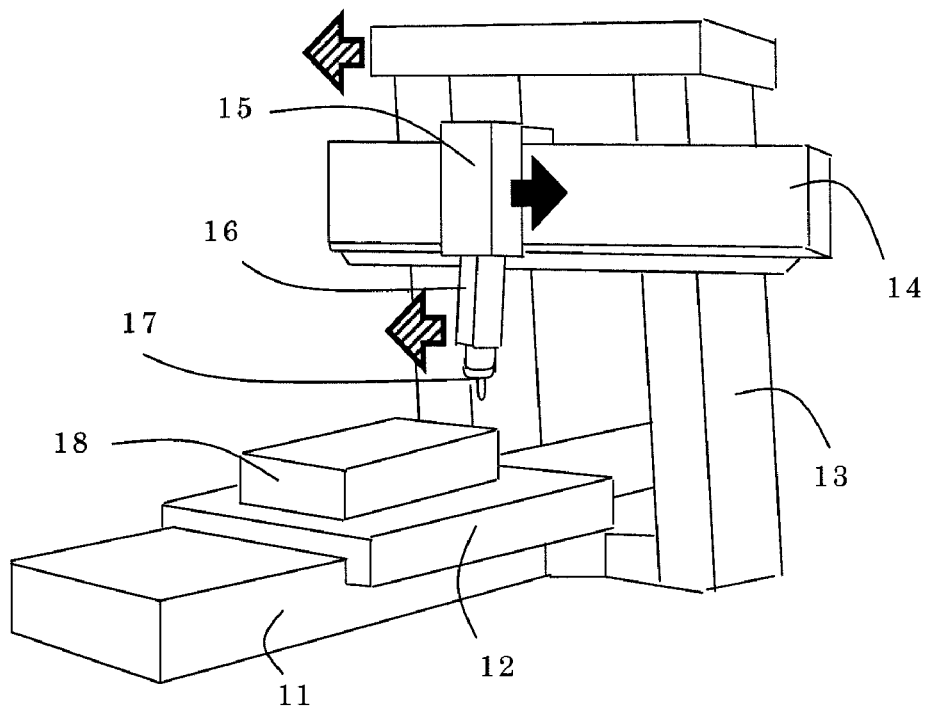
FIG. 2B illustrates a model representing the schematic mechanism of the numerically controlled machine that has generated the problem to be solved by the present invention.

FIG. 2B illustrates a model of the double-column machining center as an example of a numerically controlled machine. In the model illustrated in FIG. 2B, it is assumed that the rigidity of the columns 13 supporting the cross rail 14 is low, or the degree of coupling between the columns 13 and the ground is low, and the rigidity of the ram 16 is low. If the saddle 15 accelerates in the −Y direction, the cross rail 14 and the columns 13 receive reaction forces and displace in the +Y direction, respectively. The spindle head attached to the front end of the ram 16 receives an inertia force. As a result, the spindle head displaces in the +Y direction. The front end of the tool 17 deviates from a desired locus in the space.

In this case, the following formula 3 defines a deflection amount EC of the columns 13, in which Fc represents a Y-direction load acting on the columns 13 when the saddle 15 accelerates, and Kc represents a Y-direction rigidity of the columns 13 that includes the coupling degree between the columns 13 and the ground.

$$\epsilon c = Fc/Kc \qquad \text{formula 3}$$

Similarly, a deflection amount $\epsilon r$ of the ram 16 can be defined according to the following formula 4, when Fr represents a Y-direction load applied on the ram 16 and Kr represents a Y-direction rigidity of the ram 16 in a case where the saddle 15 accelerates.

$$\epsilon r = Fr/Kr \qquad \text{formula 4}$$

Accordingly, the tool 17 causes a displacement at its front end expressed by the following formula 5.

$$\epsilon = \epsilon c + \epsilon r \qquad \text{formula 5}$$

In the above-described formulae, Fc and Fr are proportional to the acceleration a of the saddle 15 (i.e., a movable portion).

Therefore, the displacement amount $\epsilon$ of the front end of the tool 17 can be expressed using acceleration proportional coefficients Gc, Gr, and G, according to the following formula 6.

$$\epsilon = Fc/Kc + Fr/Kr = (Gc + Gr) \times \alpha = G \times \alpha \qquad \text{formula 6}$$

The above-described formula 6 defines a relationship among the acceleration $\alpha$, the acceleration proportional coefficient G, and a total deflection amount of a structural member intervening between a workpiece to be processed and the front end of the tool 17 (i.e., two control objects). The formula 6 can be used to obtain an estimation value of a machine deflection amount caused between the workpiece to be processed and the front end of the tool 17 by using a command acceleration of the driving axis as the acceleration $\alpha$.

Meanwhile, the mechanical rigidity Kc of the columns 13 and the mechanical rigidity Kr of the ram 16 are variable depending on the position of the cross rail 14 relative to the columns 13 or depending on the protruding amount of the ram 16 relative to the saddle 15. In short, the rigidity of the mechanical system can be regarded as being variable according to a W-axis coordinate value or a Z-axis coordinate value. In other words, the parameter G in the formula 6 is a variable parameter G(z, w) that varies depending on a W-axis position or a Z-axis position.

Figure 1A:
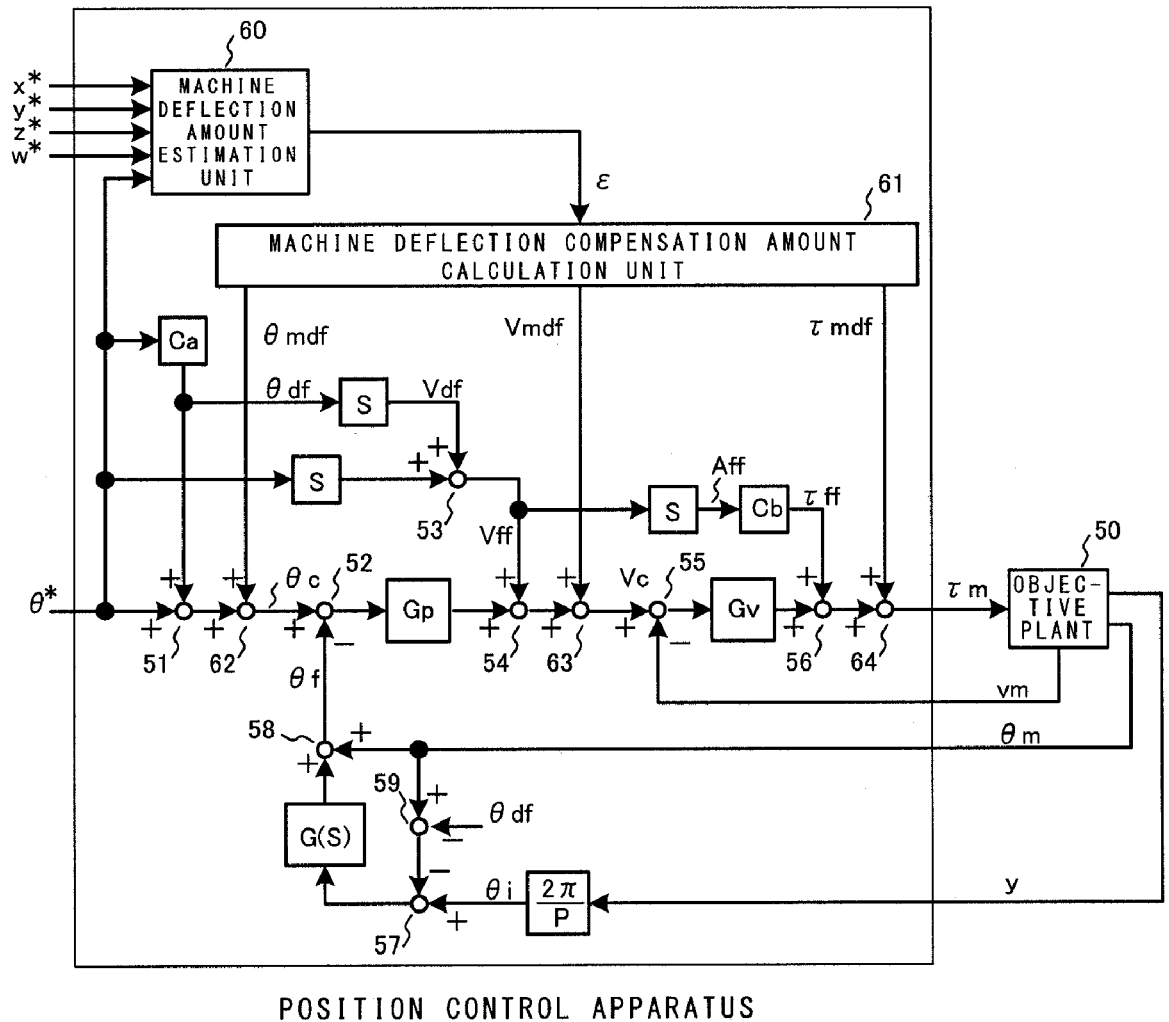
FIG. 1A is a block diagram illustrating an example of a position control apparatus according to an embodiment of the present invention.
Figure 1B:
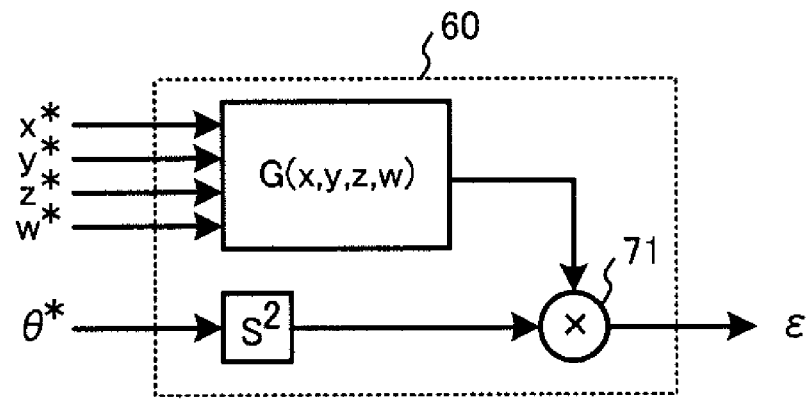
FIG. 1B is a block diagram illustrating an internal configuration of a machine deflection amount estimation unit provided in the position control apparatus according to an embodiment of the present invention.
Figure 1C:
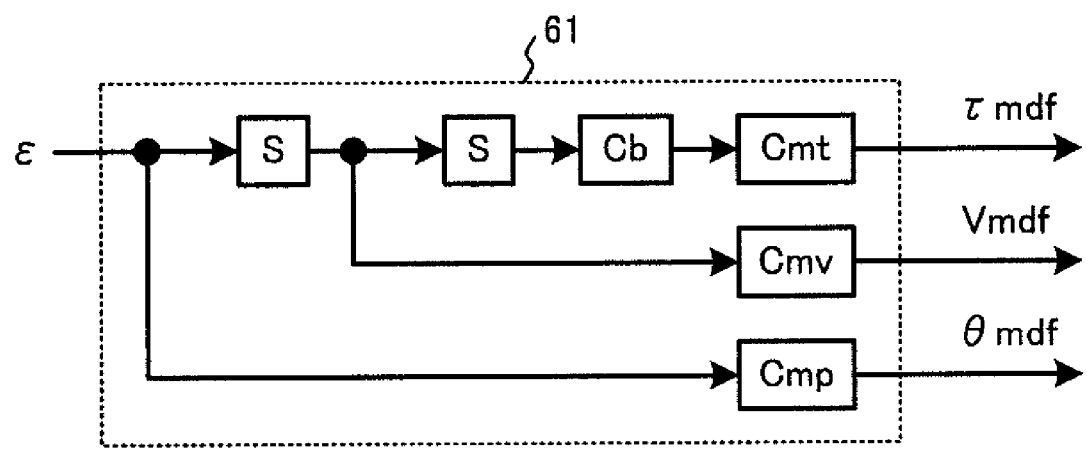
FIG. 1C is a block diagram illustrating an internal configuration of a machine deflection compensation amount calculation unit provided in the position control apparatus according to an embodiment of the present invention.

FIG. 1A is a block diagram illustrating an example of a position control apparatus according to an embodiment of the present invention. FIG. 1B is a block diagram illustrating a detailed configuration of a machine deflection amount estimation unit 60 illustrated in FIG. 1A. FIG. 1C is a block diagram illustrating a detailed configuration of a machine deflection compensation amount calculation unit 61 illustrated in FIG. 1A. In the block diagrams illustrated in FIGS. 1A, 1B, and 1C, components or portions similar to those illustrated in FIG. 4 (i.e., the above-described conventional art) are denoted by the same reference numerals and names and their descriptions are not repeated.

Compared to the above-described conventional position control apparatus, the position control apparatus according to the present embodiment includes the machine deflection amount estimation unit 60 configured to estimate the machine deflection amount ϵ and the machine deflection compensation amount calculation unit 61 configured to calculate three types of machine deflection compensation amounts θmdf, Vmdf, and τmdf based on the machine deflection amount ϵ (i.e., an estimation value) estimated by the machine deflection amount estimation unit 60.

The machine deflection amount estimation unit 60 can receive position command values x*, y*, z*, and w* of respective axes from a host apparatus. In the present embodiment, the position command values x*, y*, z*, and w* of respective axes can be regarded as posture information of a structural member intervening between the workpiece to be processed and the front end of the tool 17 (i.e., two control objects), i.e., information indicating a machine posture.

The machine deflection amount estimation unit 60 can calculate an acceleration proportional coefficient of the machine deflection amount according to the machine posture, based on the input position command values x*, y*, z*, and w* of respective axes and a predetermined function G (x, y, z, w). The machine deflection amount estimation unit 60 can further multiply the calculated acceleration proportional coefficient by a command acceleration (i.e., a second-order differential value of the position command value θ*) to calculate the machine deflection amount estimation value ϵ. In short, the machine deflection amount estimation unit 60 executes calculation according to the following formula 7.

$$\epsilon = G(x, y, z, w) \times (d^2\theta^*/dt^2) \quad \text{formula 7}$$

The machine deflection compensation amount calculation unit 61 receives the machine deflection amount estimation value E from the machine deflection amount estimation unit 60. The machine deflection compensation amount calculation unit 61 can further calculate the machine deflection position compensation value θmdf, the machine deflection speed compensation value Vmdf, and the machine deflection torque compensation value τmdf using differentiators and proportional compensators Cmp, Cmv, and Cmt. The machine deflection compensation amount calculation unit 61 can use the following formulae 8 to 10 to obtain the above-described three types of machine deflection compensation amounts θmdf, Vmdf, and τmdf.

$$\theta mdf = Cmp \times \epsilon \quad \text{formula 8}$$

$$Vmdf = Cmv \times (d\epsilon/dt) \quad \text{formula 9}$$

$$\tau mdf = Cmt \times (d^2\epsilon/dt^2) \quad \text{formula 10}$$

Figure 4:
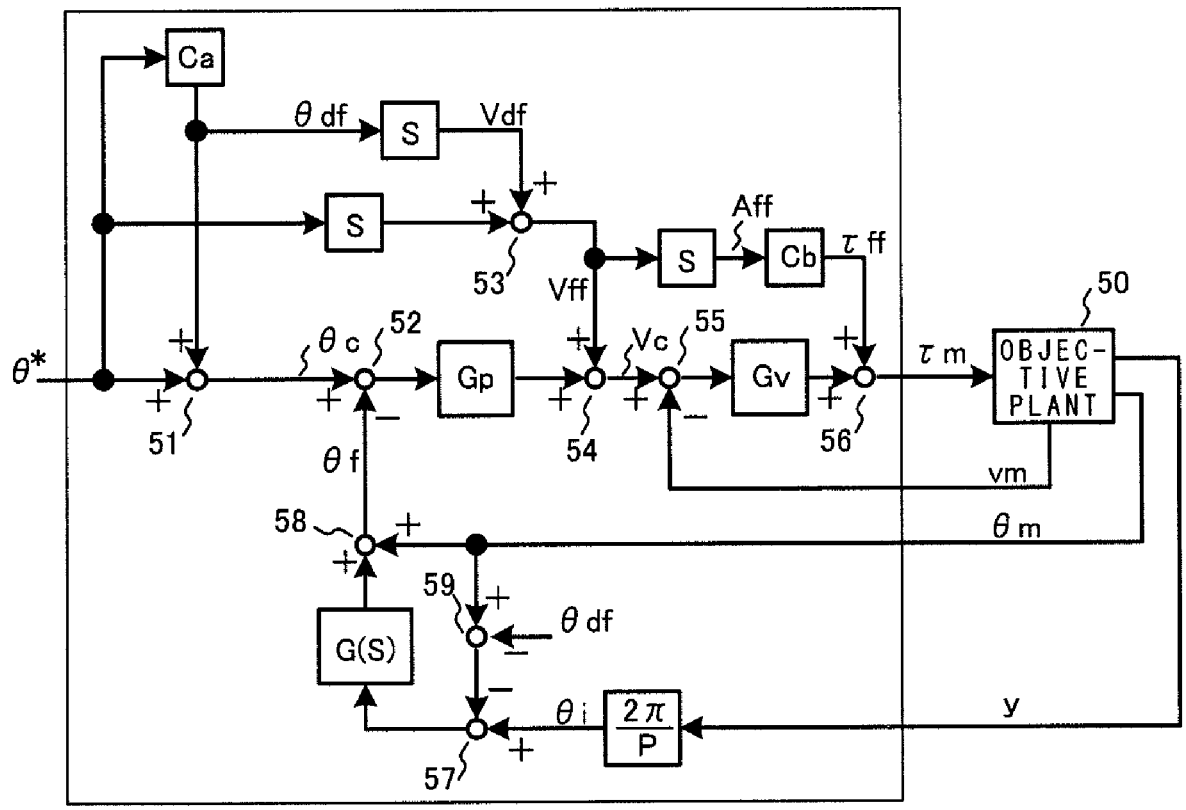
FIG. 4 is a block diagram illustrating an example of a conventional position control apparatus.

The position control apparatus according to the present embodiment illustrated in FIG. 1A can apply feed-forward compensation to the position control apparatus illustrated in FIG. 4, with respect to the machine deflection position compensation value θmdf, the machine deflection speed compensation value Vmdf, and the machine deflection torque compensation value τmdf that are output from the machine deflection compensation amount calculation unit 61. Thus, the position control apparatus according to the present embodiment illustrated in FIG. 1A can correct the locus of the front end of the tool 17 to be identical to the desired locus.

More specifically, the position control apparatus according to the present embodiment includes an adder 62 that can add the machine deflection position compensation value θmdf to the output of the adder 51 provided in the conventional position control apparatus illustrated in FIG. 4 to obtain the position command value θc for the control in the present embodiment. The position control apparatus according to the present embodiment further includes an adder 63 that can add the machine deflection speed compensation value Vmdf to the output of the adder 54 provided in the conventional position control apparatus illustrated in FIG. 4 to obtain the speed command value Vc. The position control apparatus according to the present embodiment further includes an adder 64 that can add the machine deflection torque compensation value τmdf to the output of the adder 56 provided in the conventional position control apparatus illustrated in FIG. 4 to obtain the torque command value τm.

The configuration of the function G(x, y, z, w) is variable depending on a machine structure. An FEM analysis or an actual device measurement can be used to obtain the function G(x, y, z, w). For example, coordinate values of respective axes and an acceleration value can be used, as arguments, to obtain a function representing a relative displacement amount caused between the front end portion of the tool 17 and the workpiece 18 to be processed.

For example, in FIG. 2B, it is now assumed that the displacement amount of the front end portion of the tool 17 is variable depending on a W-axis position or a Z-axis position thereof, even when the acceleration is the same. In this case, an effect of the deflection caused by the columns 13 can be approximated with a secondary function that uses the W-axis position as an argument. An effect of the deflection caused by the ram 16 can be approximated with a linear function that has a proportional relationship with the Z-axis position. In this case, the function G(x, y, z, w) can be expressed by the following the formula 11 that uses constants a, b, c, and d.

$$G(x, y, z, w) = a \times (w^*)^2 + b \times w^* + c \times z^* + d \quad \text{formula 11}$$

Further, compared to the case illustrated in FIG. 2B in which the sum of a plurality of deflection components causes the front end of the tool 17 to deviate from the desired locus, a deflection generated at a specific portion may be the only one controlling factor that may cause the front end of the tool 17 to deviate from the desired locus. In such a case, the function G (x, y, z, w) can be determined by calculating physical values (e.g., a mechanical rigidity and a load weight) at the specific portion.

The calculation unit that calculates the acceleration proportional coefficient, which is provided in the machine deflection amount estimation unit 60, need not to be configured by the function G (x, y, z, ). For example, the proportional coefficient G can be determined by referring to a data table, which can be prepared beforehand, based on the coordinate values of respective axes.

In FIGS. 1A and 1B, the machine deflection amount estimation unit 60 inputs position command values x*, y*, z*, and w* of respective axes. However, these input values can be replaced with the values x, y, z, and w having been read as position detection values. Moreover, the above-described position command values and the position detection values need not be given from the host apparatus and can be transferred from a position control apparatus that controls other axes.

Figure 3:
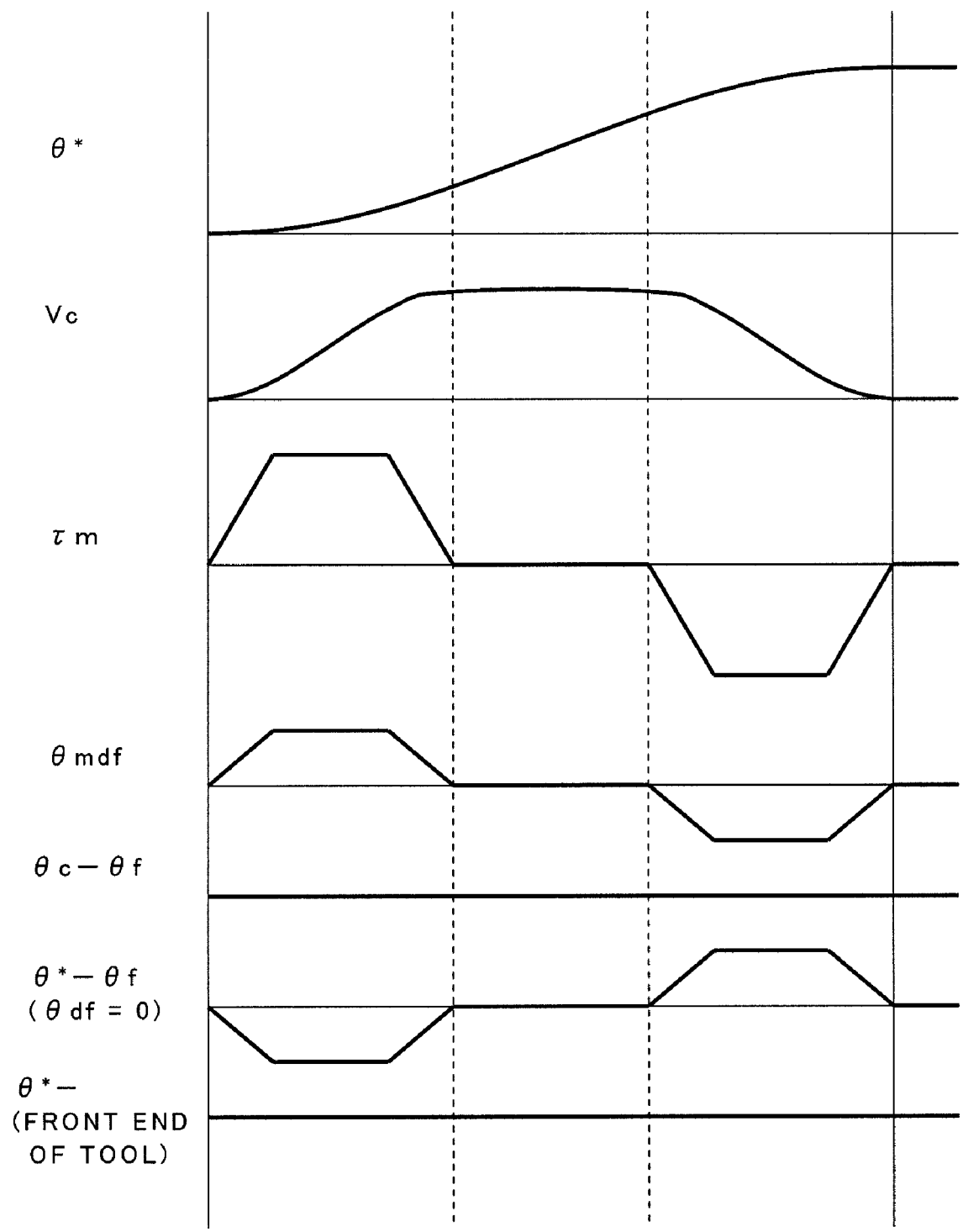
FIG. 3 is a graph illustrating effects of the present embodiment.

FIG. 3 is a graph illustrating effects of the position control apparatus according to the present invention. The position control apparatus according to the present invention calculates the speed command value Vc and the torque command value τm based on the position command value θ* received from the host apparatus.

In this case, if the feed-forward control system functions appropriately, the position command value θc for the control is substantially equal to the position feedback value θf in a state where there is no substantial follow-up delay in the control.

More specifically, a load according to the torque command value τm is applied to a machine structural member. The deflection amount generated in the mechanical system in this case and the displacement ε of the front end of the tool 17 become proportional to the torque command value τm.

It is now assumed that the machine deflection position compensation value θmdf, which is proportional to the torque command value τm (i.e., the acceleration feed-forward amount Aff), is added to the position command value θ*. In this embodiment, to simplify the description, it is assumed that the machine deflection position compensation value is equal to the displacement ε of the front end of the tool 17 (i.e., θmdf=ε).

As described above, θc−θf=0. Therefore, if θc=θ*+θmdf, θ*+θmdf−θf=0. Namely, θ*−θf=−θmdf. The position feedback value θf is controlled so as to advance by an amount of θmdf relative to the position command value θ*. However, due to the effect of a deflection caused in the mechanical system, the movement of the front end portion of the tool 17 is delayed by an amount of ε(=θmdf) relative to the position feedback value θf. Accordingly, an "advanced component" serving as a control factor can be cancelled by a "retard component" caused by the deflection of the mechanical system at the front end portion of the tool 17. In other words, the position control apparatus according to the present invention can equalize the front end position of the tool 17 with the position command value θ*. Thus, the front end portion of the tool 17 can be driven along the desired locus.

In the present embodiment, to obtain the above-described effects, it is desired that the proportional compensator Cmp of the machine deflection compensation amount calculation unit 61 is equal to 1 (Cmp=1) so that the machine deflection amount estimation value ε becomes equal to the machine deflection position compensation value θmdf. However, the machine deflection amount estimation value ε may contain an estimation error. Therefore, for the purpose of obtaining an appropriate compensation amount, it may be effective to increase the value of the proportional compensator Cmp (e.g., Cmp=1.2) to increase the machine deflection position compensation value θmdf. On the other hand, for the purpose of preventing the machine deflection compensation from becoming excessively large, it may be effective to reduce the value of the proportional compensator Cmp (e.g., Cmp=0.8) to suppress the machine deflection position compensation value θmdf, if necessary.

Further, in a case where the response of the position feedback control system is sufficiently high, the above-described effects can be obtained even when the values of the proportional compensators Cmv and Cmt are set to 0 (Cmv=0 and Cmt=0). On the other hand, if the position feedback control system has an insufficient response band, it is necessary to set the values of the proportional compensators Cmv and Cmt considering the value of the proportional compensator Cmp.

However, the machine deflection torque compensation value τmdf is proportional, in its configuration, to a fourth-order differential value of the position command value θ*. The machine deflection torque compensation value τmdf may have an impulse waveform depending on the position command value θ* and may apply shock to a driving system. To avoid the above-described drawback, it is desired to set the proportional compensators Cmp, Cmv, and Cmt so as to satisfy a relationship Cmp>Cmv≧Cmt 0.

Further, in FIG. 1, the position control apparatus adds the machine deflection position compensation value θmdf to the position command value to realize the compensation. However, a similar effect can be obtained by subtracting the machine deflection position compensation value θmdf from the position feedback value θf calculated based on the position detection value. Similarly, instead of adding the machine deflection speed compensation value Vmdf to the speed command value, the machine deflection speed compensation value Vmdf can be subtracted from the speed feedback value Vm.

Moreover, the machine deflection amount estimation unit 60 inputs coordinate values of respective axes from the host apparatus, and then internally calculates an acceleration proportional coefficient, and further outputs the machine deflection amount estimation value ε. However, the host apparatus can include a calculation unit that can calculate the acceleration proportional coefficient. In this case, the machine deflection amount estimation unit 60 can be configured to directly receive the acceleration proportional coefficient from the host apparatus and calculate the machine deflection amount estimation value ε.

The objective plant 50, which relates to a machine driving system, has the mechanism that includes the servo motor configured to drive a load via the ball screw.

A deflection in the mechanical system to be processed according to the present invention is not a component included in the driving system itself (e.g., the ball screw). The deflection to be processed according to the present invention is a deflection caused by a machine structural member, such as the columns 13 and the ram 16. Therefore, if a machine has a direct driving mechanism including a linear motor, the position control apparatus according to the present invention can equalize the locus of the front end of the tool 17 with the desired locus according to a similar compensation method.

In the above-described embodiment, the operational movement in the Y-axial direction has been described with reference to FIG. 2B. However, the technique for compensating a deflection caused in the mechanical system according to the present invention can be applied to a movement in another axial direction. Similar effects can be obtained. For example, when the ram 16 is accelerated/decelerated in the Z direction, the cross rail 14 supporting a load causes a displacement in the Z direction due to a deflection caused by the accelerated/decelerated ram 16. The deflection amount of the ram 16 is small when the saddle 15 is positioned close to the column 13 and is large when the saddle 15 is positioned at the center of the cross rail 14. Therefore, the position control apparatus can calculate a deflection compensation amount based on an acceleration value in the Z-axis direction. Further, the position control apparatus can change the compensation amount according to a Y-axis position, to constantly compensate the deflection of the mechanical system generated in the Z-axial direction according to a change in machine posture.

What is claimed is:

1. A position control apparatus that is usable in a case where a motor drives a movable portion of a numerically controlled machine to change a relative positional relationship between two control objects provided on the numerically controlled machine, wherein the position control apparatus controls the position of the movable portion based on a position command value of the motor that is input from a host apparatus, the position control apparatus comprising:

a machine deflection amount estimation unit that calculates a machine deflection amount estimation value representing a relative displacement amount between the two control objects that may be caused by a deflection of a structural member intervening between the two control objects based on information indicating a posture of the intervening structural member and information indicating a driving acceleration of the movable portion;

a machine deflection compensation amount calculation unit that calculates a machine deflection position compensation value based on the machine deflection amount estimation value for compensating at least a positional deviation that may be caused by a deflection of the intervening structural member; and a command value calculation unit that generates a new position command value for the control by adding the machine deflection position compensation value to the position command value.

2. The position control apparatus according to claim 1, wherein the information indicating the posture of the intervening structural member is a machine coordinate value of the movable portion in each axial direction, and the information indicating the driving acceleration of the movable portion is the position command value of the motor, wherein the machine deflection amount estimation unit comprises:

a storage unit that stores acceleration proportional information that represents information for calculating an acceleration proportional coefficient of a machine deflection amount that changes according to the machine coordinate value of the movable portion in each axial direction;

an acceleration proportional coefficient calculation unit that calculates the acceleration proportional coefficient of the machine deflection amount according to a present posture of the intervening structural member based on the machine coordinate value of the movable portion in each axial direction and the acceleration proportional information stored in the storage unit;

two differentiators that calculate a command acceleration that corresponds to a second-order differential value of the position command value of the motor; and a multiplier that calculates the machine deflection amount estimation value by multiplying the acceleration proportional coefficient of the machine deflection amount with the command acceleration.

3. The position control apparatus according to claim 1, wherein at least one of the two control objects is disposed on the movable portion, and the machine deflection amount estimation unit calculates a deflection amount generated in a movable direction of the movable portion as the machine deflection amount estimation value.

4. The position control apparatus according to claim 1, further comprising:

a calculation unit that calculates a speed command value using a position deviation amplifier that can amplify a differential value between the position command value of the motor and a position detection value; and a calculation unit that calculates a torque command value using a speed deviation amplifier that can amplify a differential value between the speed command value and a time-differential value of the position detection value, wherein the machine deflection compensation amount calculation unit calculates at least one of a machine deflection speed compensation value and a machine deflection torque compensation value in addition to the machine deflection position compensation value, and the command value calculation unit calculates a new speed command value for the control by adding the machine deflection speed compensation value to the speed command value in a case where the machine deflection speed compensation value is calculated, and further the command value calculation unit calculates a new torque command value for the control by adding the machine deflection torque compensation value to the torque command value in a case where the machine deflection torque compensation value is calculated.

5. The position control apparatus according to claim 1, where the machine deflection compensation amount calculation unit calculates the machine deflection position compensation value using a proportional compensator based on the input machine deflection amount estimation value, calculates a machine deflection speed compensation value using a differentiator and a proportional compensator, and calculates a machine deflection torque compensation value using two differentiators, an acceleration-torque conversion coefficient, and a proportional compensator, wherein position, speed, and torque compensation values are adjusted by changing setting values of the proportional compensators.

6. The position control apparatus according to claim 4, wherein the command value calculation unit calculates a new speed command value for the control by subtracting the machine deflection speed compensation value from the time-differential value of the position detection value that serves as a speed feedback value.

7. The position control apparatus according to claim 1, wherein the command value calculation unit calculates a new position command value for the control by subtracting the machine deflection position compensation value from the position detection value that serves as a position feedback value.

* * * * *